United States Patent [19]
Chen

[11] Patent Number: 5,978,775
[45] Date of Patent: Nov. 2, 1999

[54] INFORMATION DISTRIBUTION SYSTEM USING TELEPHONE NETWORK AND TELEPHONE COMPANY BILLING SERVICE

[75] Inventor: Matthew Shih Chang Chen, Ocean, N.J.

[73] Assignee: Lucent Technologies Inc., Murray Hill, N.J.

[21] Appl. No.: 08/784,870

[22] Filed: Jan. 16, 1997

Related U.S. Application Data

[63] Continuation of application No. 08/164,093, Dec. 8, 1993, abandoned.

[51] Int. Cl.$^6$ .................................................. G06F 153/00
[52] U.S. Cl. ................................................. 705/26; 705/27
[58] Field of Search ................................... 705/1, 26–27, 705/28; 235/383; 379/90.01, 91.01, 92.02–92.04, 100.08, 93.12

[56] References Cited

U.S. PATENT DOCUMENTS

| | | | |
|---|---|---|---|
| 5,247,575 | 9/1993 | Sprague et al. | 380/9 |
| 5,319,542 | 6/1994 | King, Jr. et al. | 705/1 |

OTHER PUBLICATIONS

Snider, "Shopping in the information age (computerized shopping)", The fucurist, v26, n6, p14(5) Nov.–Dec. 1992, Dialog file 47, Accession No. 03814277.

Schreiber, "Public Computer Link", Newsday (Melville, NY, US), v49 n233 s1 p59, Apr. 26, 1989, Newspaper article, Dialog file 635, Accession No. 0093429.

"1st clash: electronic retailing to buck old–line stores.", Discount Store News, v24, p3(2), Mar. 4, 1985, Dialog file 148, Accession No. 02316694.

*Primary Examiner*—Frantzy Poinvil

[57] ABSTRACT

An information distribution system that allows a customer to retrieve desired information from an information supplier over a communications network and be billed for the retrieved information on the customer's telephone bill. The billing feature may be implemented using existing telephone company premium-rate billing services that allow the telephone company to bill the customer for the call with the telephone company transferring a portion of the payment to the information supplier. A customer desiring to retrieve information is presented with a list of available information items. Upon a customer's selection of a desired information item, a data file is accessed that contains the telephone number of the appropriate information supplier and a retrieval code that identifies the selected information item. The customer's computing system transmits a request to the information supplier for the selected information, identified by its retrieval code. The information supplier will then access the data file which contains the desired information item and then download the requested information item to the customer's computing system. The customer will be billed for the downloaded information on their telephone bill, with a portion of the payment being transferred by the telephone company to the information supplier.

49 Claims, 13 Drawing Sheets

FIG. 2A

| Information Items | Description | Price Structure |
|---|---|---|
| Menu Assistant | Plan tasty and nutritious meals | 9.95 |
| Garden Assistant | Gardening advice | 9.95 |
| Auto Wiz | Car care answers | 14.95 |
| ... | | |
| Item n | | |

FIG. 2B

| Information Items | Item Descriptions | Price Structure | Retrieval Code | Telephone Number |
|---|---|---|---|---|
| Menu Assistant | Plan tasty and nutritious meals | 9.95 | 21 | 1 900 672 6368 |
| Garden Assistant | Gardening advice | 9.95 | 22 | 1 900 672 6368 |
| Auto Wiz | Car care answers | 14.95 | 23 | 1 900 227 2273 |
| ... | | | | |
| Item n | | | | |

INFORMATION DISTRIBUTION SYSTEM USING TELEPHONE NETWORK AND TELEPHONE COMPANY BILLING SERVICE

This is a continuation of application Ser. No. 08/164,093 filed on Dec. 8, 1993, now abandoned.

FIELD OF THE INVENTION

The present invention relates to an information distribution system, and more particularly, to an information distribution system that allows an information supplier to transmit desired information to a customer over a communications network with the customer being billed for the delivered information on the customer's telephone bill.

BACKGROUND OF THE INVENTION

Due to the abundance of information available for sale or license in today's marketplace, it is often a formidable task for a customer to be aware of even a portion of the information that is available. Furthermore, the task is often made even more difficult by the customer's desire to make use of the resources of a number of different information suppliers, in order to ensure access to a diverse range of information.

Unfortunately, the success of a centralized information distribution system, capable of coordinating a customer's information retrievals from a number of different information suppliers, has been restricted by the lack of a convenient billing method capable of accommodating the unique billing needs of each information supplier.

Many information suppliers presently utilize centralized computer bulletin board systems (BBS) or similar on-line information services to distribute information to customers. A bulletin board system or on-line information service typically presents a customer with a listing of the information that is available, and allows the customer to select desired information to be downloaded to the customer's computer terminal.

A customer is typically billed for information retrieved from a bulletin board or on-line information service in one of two ways. First, the customer can be billed based on the duration of the call. However, under this arrangement, there is little, if any, relationship between the fee charged and the value of the downloaded information. Furthermore, in order to ensure collection of the fee, a pre-existing contractual arrangement is normally required that obligates the customer to pay for retrieved information.

Alternatively, information suppliers can make their information available on a bulletin board service and collect the appropriate fee upon a customer's voluntary compliance with the license registration. However, the collection of the fee under such an arrangement is dependent upon the good faith of the customer.

As apparent from the above deficiencies with prior information distribution systems, a need exists for an information distribution system that allows an information supplier to sell or license data to a customer, without the need for a pre-existing contractual arrangement. In addition, a further need exists for an information distribution system that establishes a fee that is based on the value of the retrieved information.

SUMMARY OF THE INVENTION

Generally, according to one aspect of the invention, a customer can retrieve desired information from an information supplier over a communications network of a telephone company and be billed for the retrieved information by the telephone company on the customer's telephone bill.

According to another aspect of the invention, this billing feature is implemented using existing telephone company premium-rate billing services, such as 900 premium-rate services, that allow the telephone company to bill the customer for the call with the telephone company transferring a portion of the payment to the information supplier.

A customer desiring to retrieve information is presented with a list of available information items. Once the customer has selected a desired information item, a data file is accessed that contains the telephone number assigned to the information supplier that provides the selected information item, as well as a retrieval code that uniquely identifies the selected information item.

The customer's computing system will establish a connection to the appropriate information supplier by dialing the retrieved telephone number and will then transmit a request to the information supplier for the selected information, identified by its retrieval code. The information supplier will thereafter access another data file, identified by the retrieval code, which contains the desired information item. The information supplier can then download the retrieved information item to the customer's computing system.

The data file maintained by the information supplier for each information item may include an indication of the specific pricing structure to be utilized in collecting the fee for the corresponding information item. Thus, when a call is received requesting a particular information item, identified by its retrieval code, the information supplier can transmit an indication of the appropriate pricing structure to the telephone company to be utilized in determining the price to be charged for the call. Alternatively, an information supplier can utilize a plurality of premium-rate telephone lines, each having a unique pricing structure, to implement variable billing.

In this manner, the customer will be billed for the downloaded information on their telephone bill, with the price charged for each information item being based on the value of the particular information item that is retrieved. A portion of the payment received by the telephone company is transferred to the information supplier.

A more complete understanding of the present invention may be had by reference to the following Detailed Description with the accompanying drawings.

BRIEF DESCRIPTION OF DRAWINGS

FIG. 2A illustrates an information menu for presenting a list of available information items that may be accessed by a customer;

FIG. 2B illustrates an information menu configuration file that maintains specifications on the information items listed in the information menu of FIG. 2A;

DETAILED DESCRIPTION

Figure 1:
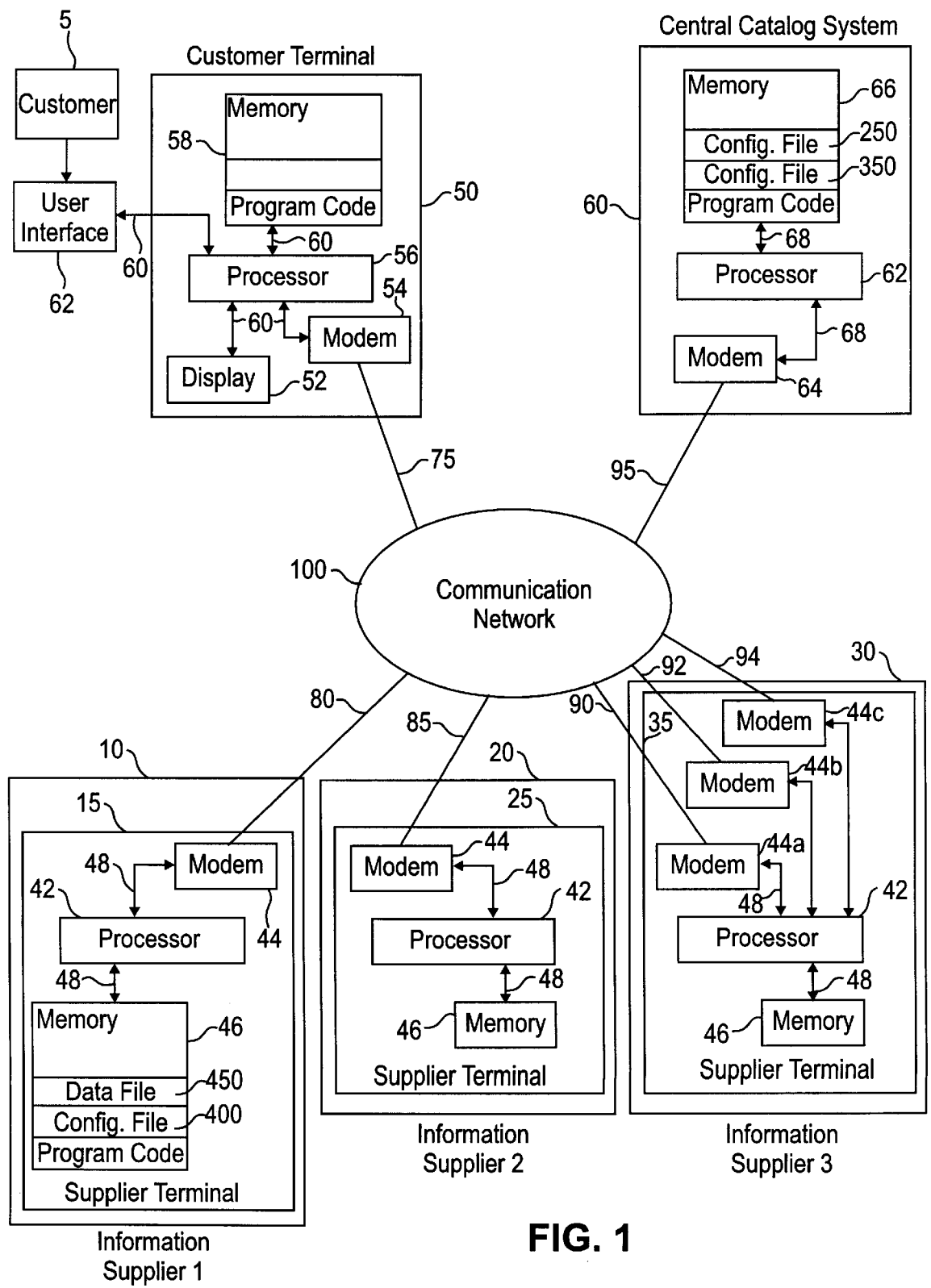
FIG. 1 is a schematic block diagram illustrating a simplified communications network for interconnecting a customer with a central catalog system and a number of information suppliers.

As illustrated in FIG. 1, the information distribution system disclosed herein allows a customer 5 to access desired information items, i.e., data or software programs, provided by a plurality of information suppliers, such as suppliers 10, 20, 30, over a communications network 100.

Each customer 5 employs a customer terminal 50, which is preferably a general purpose computer which may be comprised of a display 52, modem 54, processing unit 56, memory 58, buses 60 and user interface 62, such as a mouse and/or a keyboard. As illustrated in FIG. 1, the memory 58 may include the program code necessary to execute the processes described below in conjunction with FIGS. 5A through 5D.

Figure 7A:
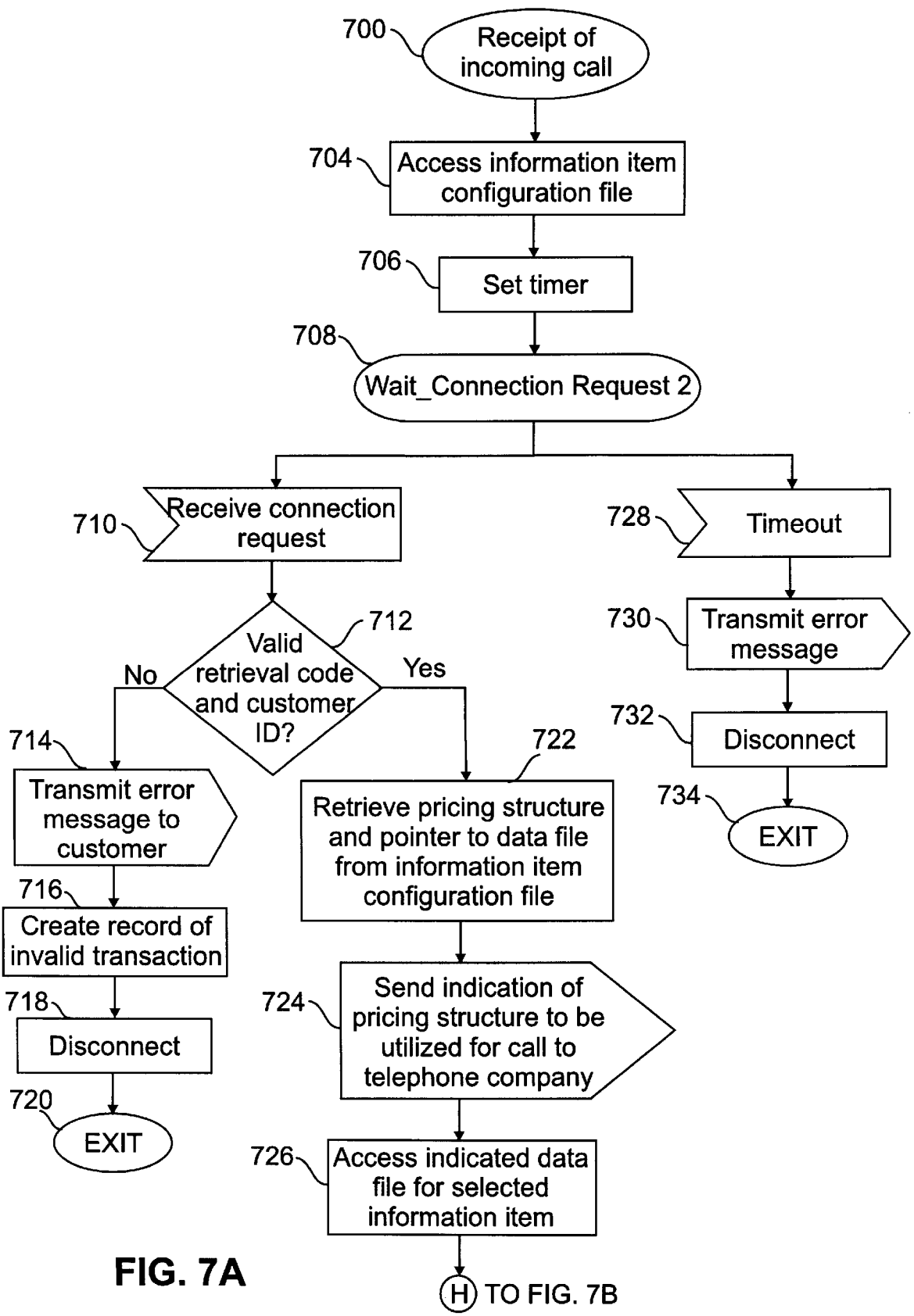
FIGS. 7A through 7B, collectively, are a flow chart describing an exemplary method according to the present invention as utilized by a supplier terminal for downloading selected information to a customer.
Figure 7B:
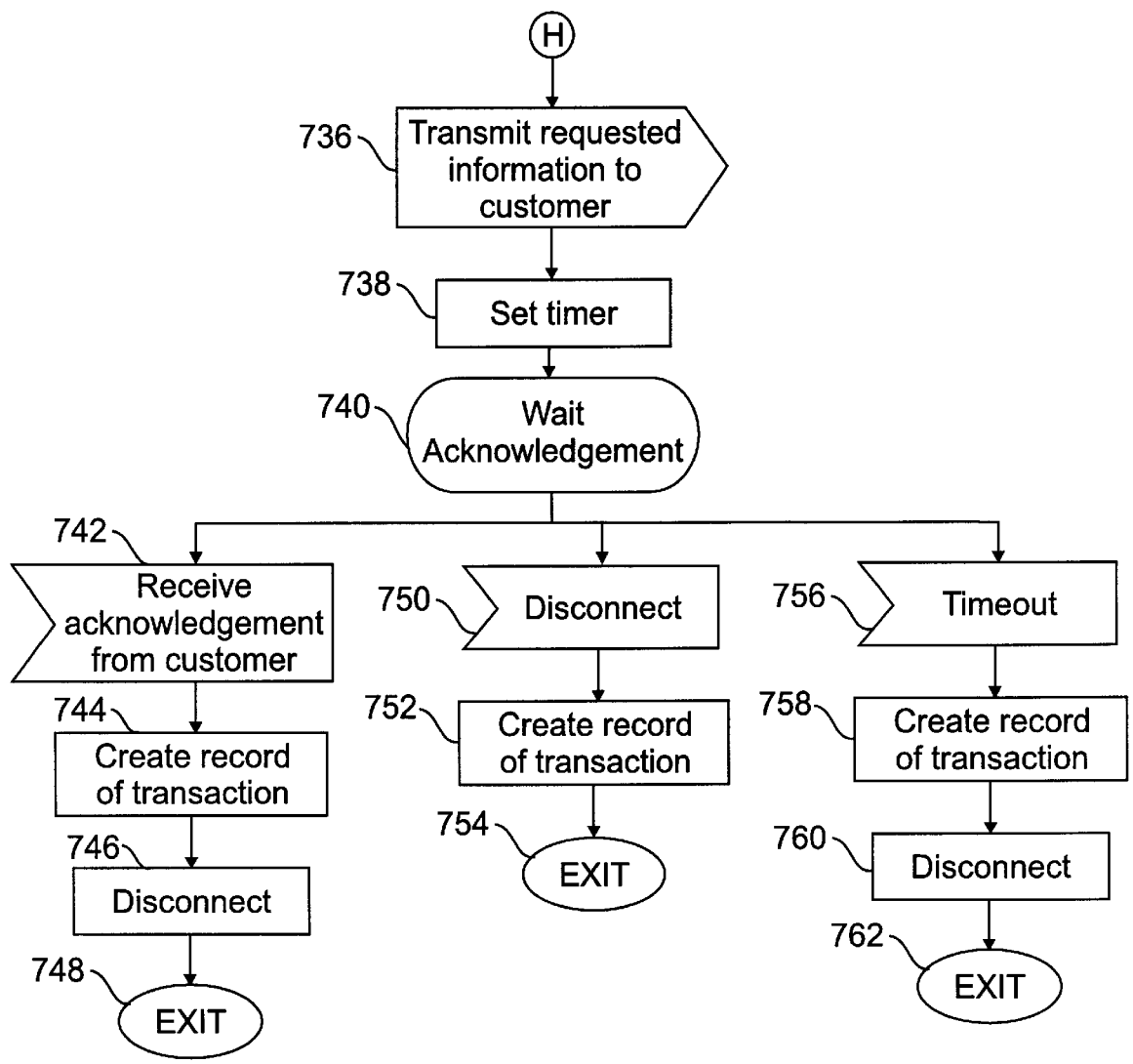

In addition, each information supplier, such as suppliers 10, 20, 30, preferably employs a supplier terminal 15, 25, 35, such as the supplier terminal 15 employed by supplier 10. Each supplier terminal, such as terminal 15, 25, 35, is preferably a general purpose computer which may be comprised of a processing unit 42, modem 44, memory 46 and buses 48. As illustrated in FIG. 1, memory 46 may include information item data files 450 and an information item configuration file 400, discussed below relative to FIG. 4, as well as the program code necessary to execute the processes described below in conjunction with FIGS. 7A through 7B.

The information distribution system preferably utilizes a number of configuration files, e.g., 250, 350, illustrated in FIGS. 2B and 3B, respectively, and discussed further below, for storing specifications on accessing the information that is available through the information distribution system from the plurality of information suppliers 10, 20, 30.

Figure 6A:
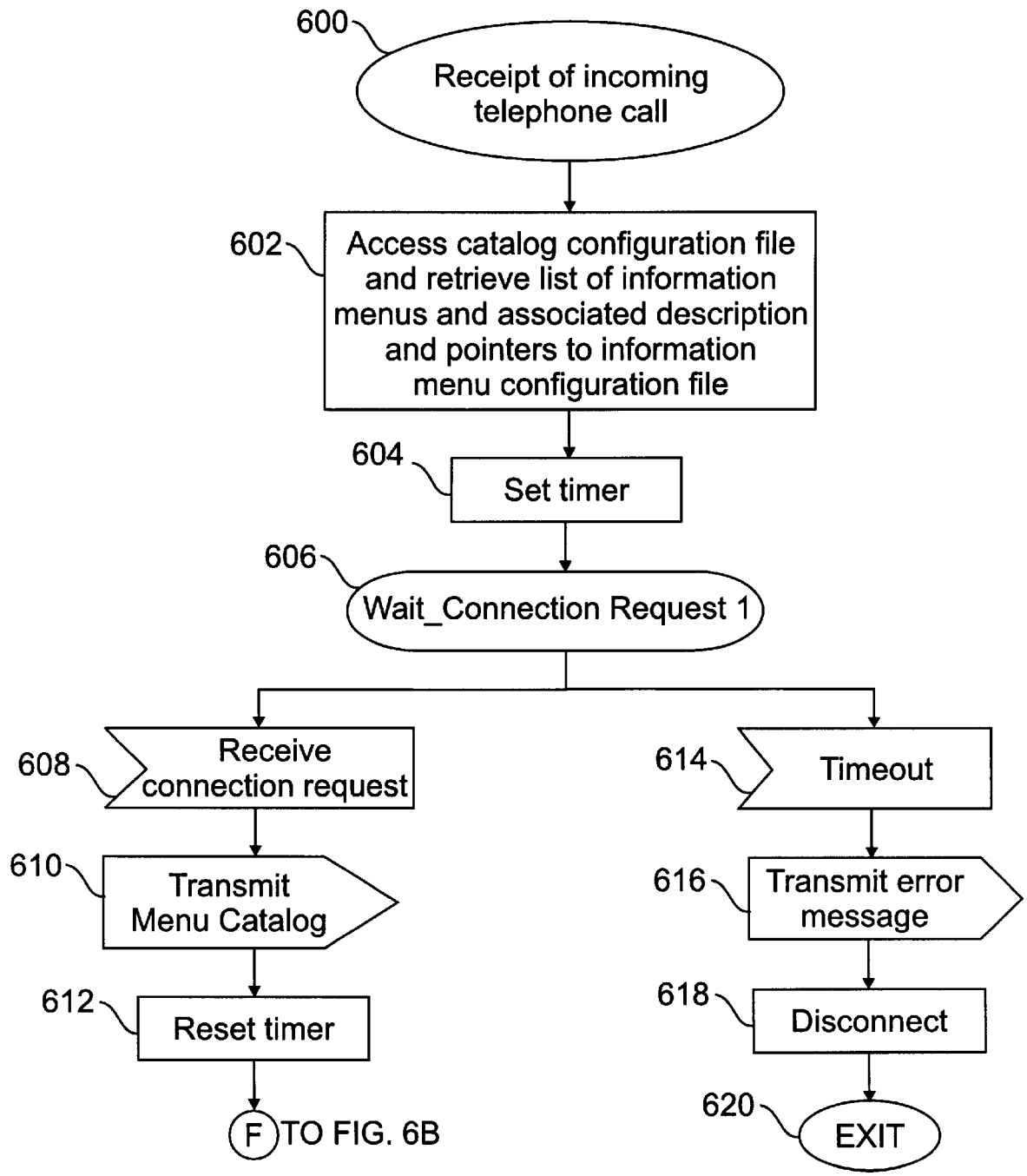
FIGS. 6A through 6C, collectively, are a flow chart describing an exemplary method according to the present invention as utilized by a central catalog system for assisting a customer with the selection of desired information.
Figure 6B:
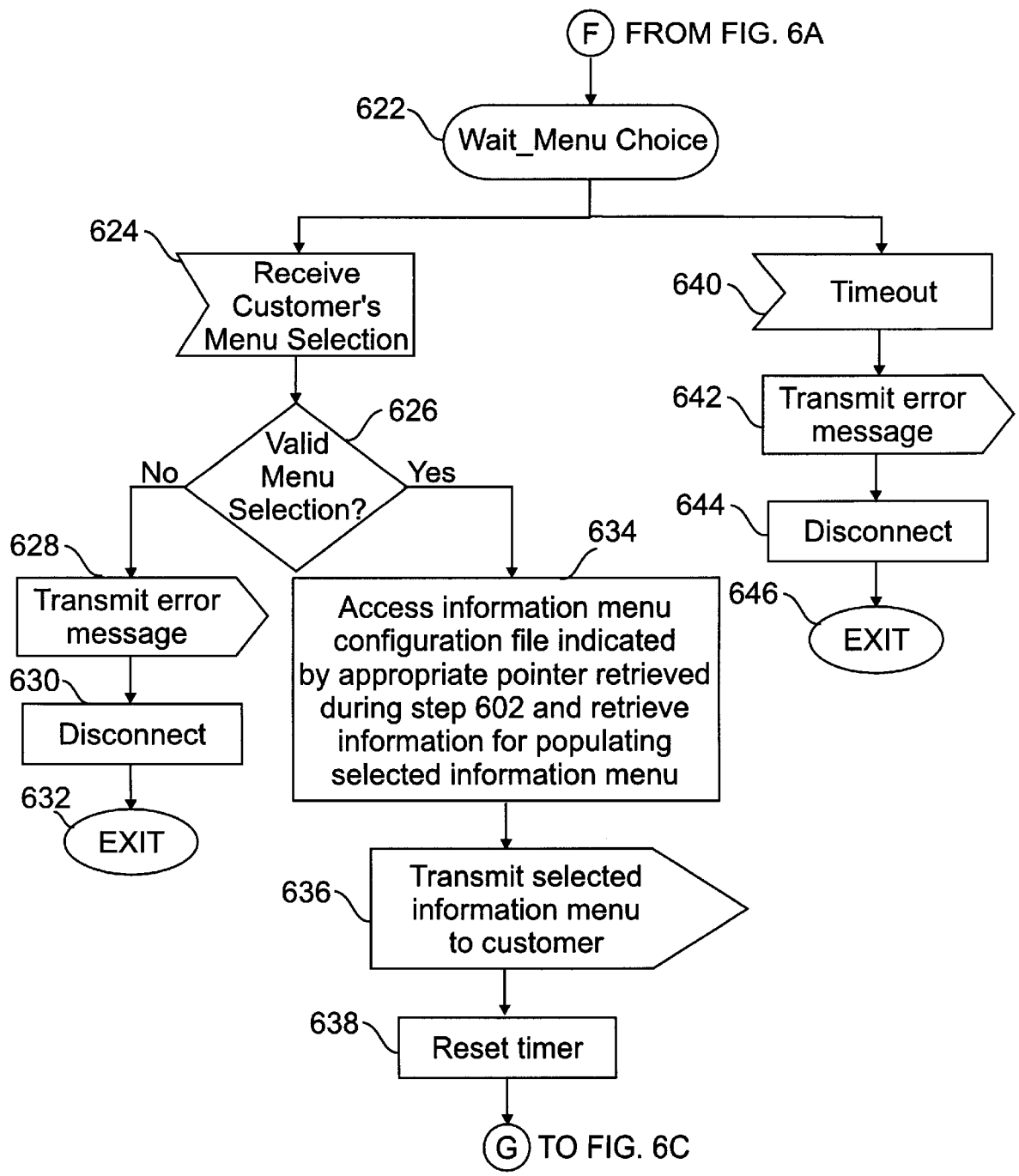
Figure 6C:
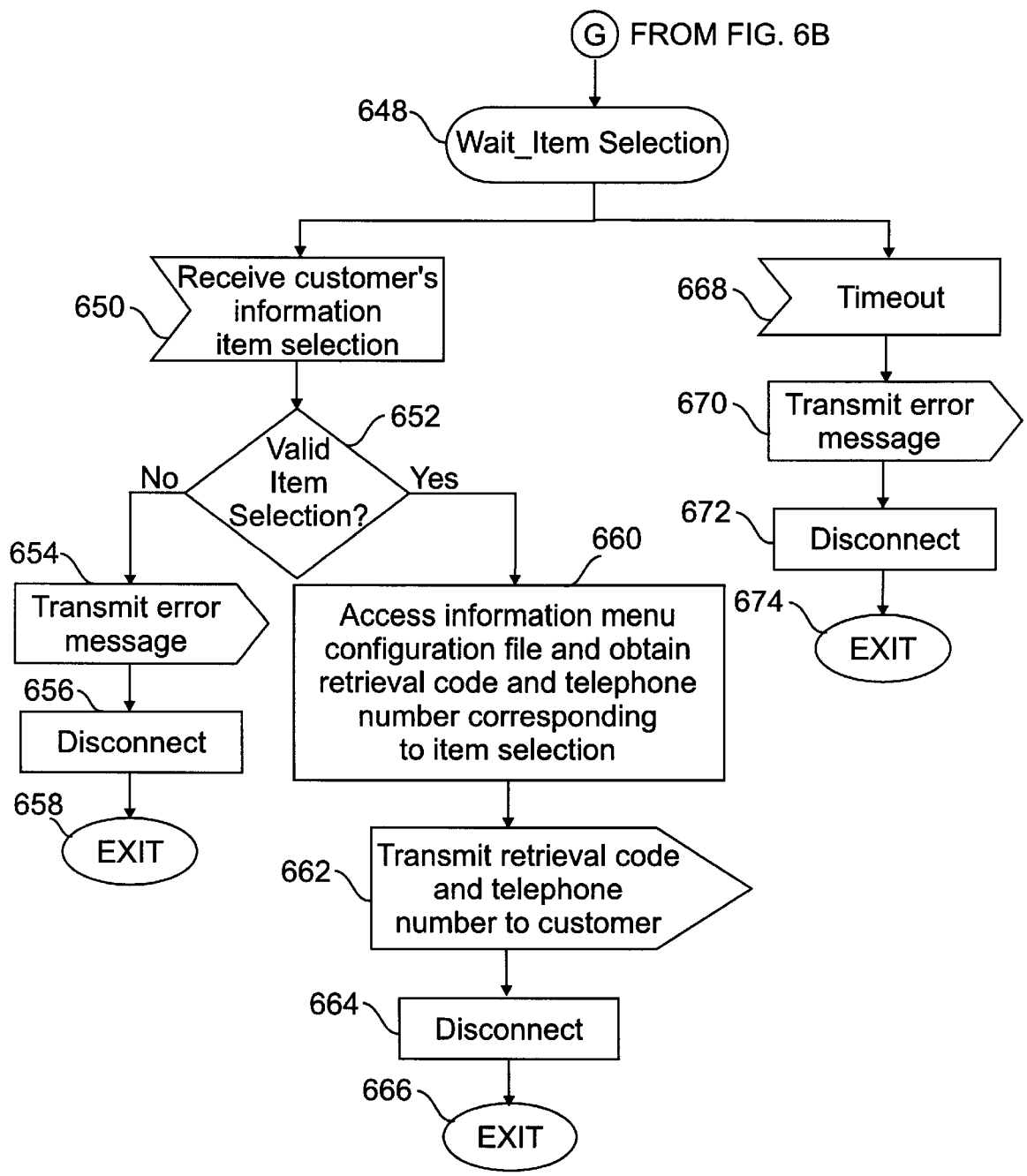

The configuration files 250, 350 are preferably stored in a central catalog system 60. The central catalog system 60 is preferably embodied as a general purpose computer which may be comprised of a processing unit 62, modem 64, memory 66 and buses 68. As illustrated in FIG. 1, memory 66 may include configuration files 250, 350, discussed further below, as well as the program code necessary to execute the processes described below in conjunction with FIGS. 6A through 6C. The central catalog system 60 may communicate with a customer 5 or information supplier 10, 20, 30 by means of communications network 100 and associated telephone line 95.

Alternatively, rather than storing the configuration files 250, 350 in a central catalog system 60, the configuration files 250, 350 can be periodically updated and distributed to each customer 5 via a medium, such as CD-ROM, for local storage in the memory 58 of each customer terminal 50. The use of a central catalog system 60, remotely accessed via communications network 100, is preferred, however, due to the extremely dynamic nature of the information contained in configuration files 250, 350, as well as the anticipated difficulty of coordinating periodic updates from the plurality of information suppliers 10, 20, 30.

It is noted that each memory unit, such as memory units 46, 58, 66, is preferably comprised of the normal complement of RAM, ROM and cache memory, as well as secondary storage devices, such as external disk drives. In addition, each processing unit, such as processors 42, 56, 62, preferably includes associated timers for monitoring timeout periods, as discussed further below.

Typically, an information supplier 10, 20, 30 will offer a plurality of information items, i.e., different data and/or software programs. In order to distinguish between the various information items offered by a single information supplier, each information supplier 10, 20, 30 can designate a retrieval code, which is a label that identifies each of the information items offered by the respective supplier.

According to a feature of the invention, a customer, such as the customer 5 of FIG. 1, is billed for information retrieved from an information supplier, e.g., 10, 20, 30, by the telephone company on the customer's telephone bill. Preferably, this billing feature is implemented using existing premium-rate telephone billing services, such as 900 premium-rate services, which allow a telephone company to bill the caller for the transaction with the telephone company transferring a portion of the payment to the called party.

Accordingly, each information supplier preferably subscribes to a premium-rate billing service, such as 900 service or a similar billing service, and is assigned a telephone number having a 900 area code. Calls that are dialed by the customer 5 to the 900 telephone number associated with a particular information supplier, such as suppliers 10, 20, 30, will be terminated by the network 100 on the respective supplier's premium-rate telephone line, such as lines 80, 85, 90, 92, 94.

According to a further feature of the invention, each information supplier, such as suppliers 10, 20, 30, can implement a variable billing feature to establish a unique fee for each customer transaction that is based on the value of retrieved information.

Existing premium-rate telephone services offer two mechanisms for establishing variable billing using 900 telephone lines. First, a unique pricing structure can be established for each 900 telephone line. Thus, an information supplier, such as the supplier 30, can implement variable billing utilizing a plurality of 900 telephone lines, such as the 900 telephone lines 90, 92, 94 utilized by supplier 30, each having its own unique pricing structure. As discussed further below, each information item provided by the respective information supplier, such as supplier 30, is thereafter made available on the appropriate 900 line, such as lines 90, 92, 94, having the proper pricing structure.

Second, enhanced premium-rate services allow a subscriber to establish variable billing structures for calls to the same premium-rate telephone line by allowing the called party to send to the telephone company an indication of the particular pricing structure to be utilized by the telephone company in establishing the fee for each call on the respective 900 telephone line.

As discussed further below, an information supplier, such as suppliers 10, 20, who has subscribed to one of the above-mentioned enhanced 900 billing services may assign separate pricing structures for each unique information item offered by the supplier 10, 20 via respective 900 telephone lines 80, 85. Thereafter, upon receiving a request by the customer 5 for a particular information item, the information supplier, such as suppliers 10, 20, can indicate to the telephone company the appropriate pricing structure to be utilized in billing the customer 5 for the call. In this manner, each information supplier 10, 20 can establish a variable fee for each customer transaction that is based on the value of retrieved information using a single 900 telephone line.

The information distribution system facilitates the retrieval of desired information by presenting the customer 5 with an information menu 200, illustrated in FIG. 2A, which includes a plurality of rows, such as rows 225, 230, 235, for listing each available information item. For each information item listed in column 205, the information menu 200 preferably includes a description in column 210 of each information item and an indication in column 215 of the associated pricing structure.

For example, one available information item is the garden assistant indicated in row 230 of the illustrative information menu 200 illustrated in FIG. 2A. As indicated in the information menu 200, the garden assistant provides gardening advice for a price of $9.95. In this manner, the customer 5 can be presented with a list of available information item alternatives, such as the garden assistant option, and be prompted to select a desired information item from the presented list.

The information that appears in the information menu 200 is preferably stored in an information menu configuration file, such as the configuration file 250, illustrated in FIG. 2B. The information menu configuration file 250 maintains a plurality of rows, such as rows 280, 285, 290, each associated with an available information item. For each information item listed in column 255, the information menu configuration file 250 includes a description in column 260 of the associated information item and an indication in column 265 of the price structure of the associated information item, as appears in the information menu 200 of FIG. 2A. In addition, the information menu configuration file 250 includes additional configuration information for each listed information item that does not appear in the information menu 200, i.e., a retrieval code in column 270 which uniquely identifies the associated information item, and the appropriate telephone number in column 275 for accessing the appropriate telephone line of the respective information supplier, such as suppliers 10, 20, 30.

In a preferred embodiment, a plurality of specialized information menus 200 are provided, associated with, e.g., different subject areas; different classes of information, i.e., information that is available for sale or license; or different types of computer systems that will utilize the information, i.e., information specifically intended for a Macintosh computer or a personal computer operating under a DOS or OS/2 operating system. In this manner, the customer 5 can be presented with a focused list of available information that is more closely related to the customer's needs. An information supplier, such as suppliers 10, 20, 30, can designate the appropriate information menus, such as menu 200, upon which various information items should appear.

Figure 3A:
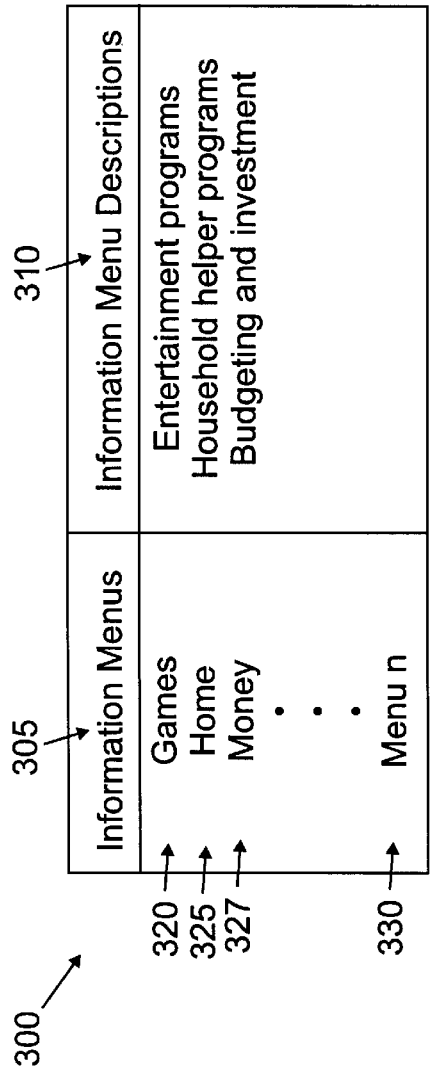
FIG. 3A illustrates a menu catalog for presenting a list of available subject specialized information menus.

The plurality of information menus 200 can be presented to the customer in a menu catalog, such as the menu catalog 300, illustrated in FIG. 3A. Each menu catalog 300 includes a plurality of rows, such as rows 320, 325, 330, each associated with an available information menu, such as menu 200. The menu catalog 300 preferably contains a description in column 310 of each information menu, such as information menu 200, listed in column 305. For example, the "home" information menu listed in row 325, which is described in column 310 as being a menu of household helper programs, is the information menu 200 illustrated in FIG. 2A.

Figure 3B:
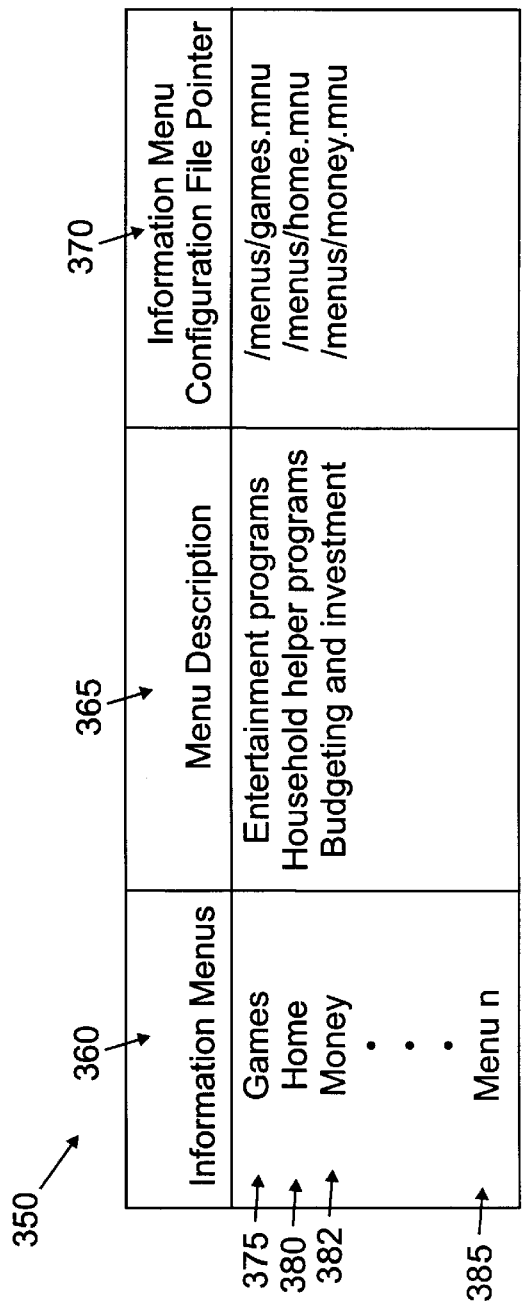
FIG. 3B illustrates a catalog configuration file that maintains specifications on the subject specialized information menus listed in FIG. 3A.

The information that appears in the menu catalog 300 is preferably stored in a catalog configuration file, such as the catalog configuration file 350, illustrated in FIG. 3B. The catalog configuration file 350 includes a plurality of rows, such as the rows 375, 380, 385, each associated with an information menu 200. For each information menu listed in column 360, the catalog configuration file 350 preferably includes a description in column 365 of the associated information menu 200, as appears in the menu catalog 300 of FIG. 3A. In addition, the catalog configuration file 350 includes additional configuration information for each listed information menu that does not appear in the menu catalog 300, i.e., a pointer in column 370 to the information menu configuration file 250 (FIG. 2B) that is associated with each information menu 200.

Figure 4:
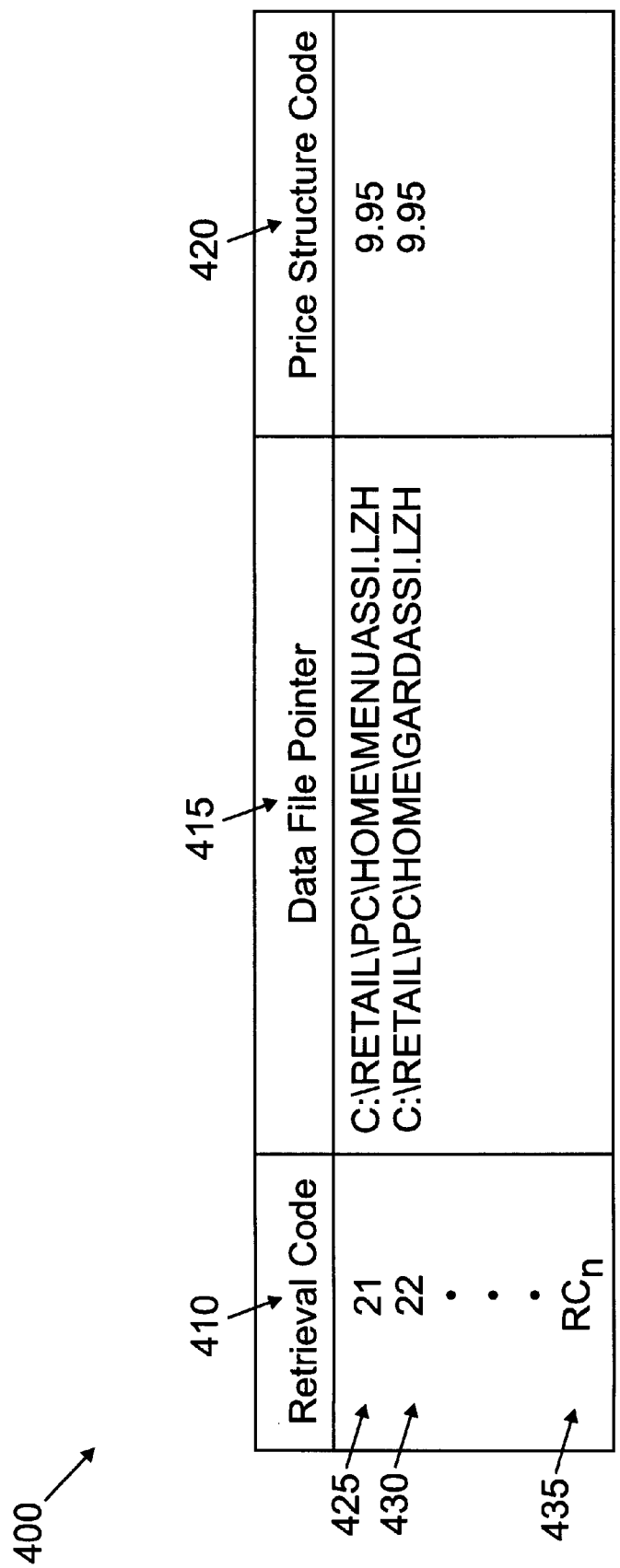
FIG. 4 illustrates an information item configuration file used by an information supplier for storing specifications on the information items offered by the respective information supplier.

In addition, each information supplier 10, 20, 30 preferably maintains an information item configuration file, such as the information item configuration file 400, illustrated in FIG. 4, which contains certain specifications for each information item offered by the respective information supplier. The information item configuration file 400 includes a row, such as rows 425, 430, 435, for each information item provided by the respective information supplier. For each information item provided by a supplier, the information item configuration file 400 will indicate the associated retrieval code in column 410, a pointer in column 415 to the appropriate data file, such as a data file 450, containing the respective information item and, optionally, an indication in column 420 of the pricing structure to be utilized in establishing a fee for the corresponding information item.

For example, as indicated in row 425 of the information item configuration file 400 illustrated in FIG. 4, the associated information supplier, such as supplier 10, provides an information item having a retrieval code of 21. The data file that contains the respective information item is listed in column 415. In addition, supplier 10 has established a price of $9.95 for the respective information item.

As discussed further below, the processes embodying the principles of the present invention require interaction between customer terminal 50, central catalog system 60 and supplier terminals 15, 25, 35. A convention has been adopted in the flow charts of FIGS. 5A through 5D, 6A through 6C and 7A through 7B, to illustrate the transfer of signals between the various computing systems. When a computer terminal is transmitting a signal to another terminal, the process step is illustrated in a box shaped as a right-pointing arrow, such as step 504 of FIG. 5A. Similarly, when one computer terminal is receiving a signal transmitted from another terminal, the process step is illustrated in a flag-shaped box, such as step 510 of FIG. 5A.

Figure 5A:
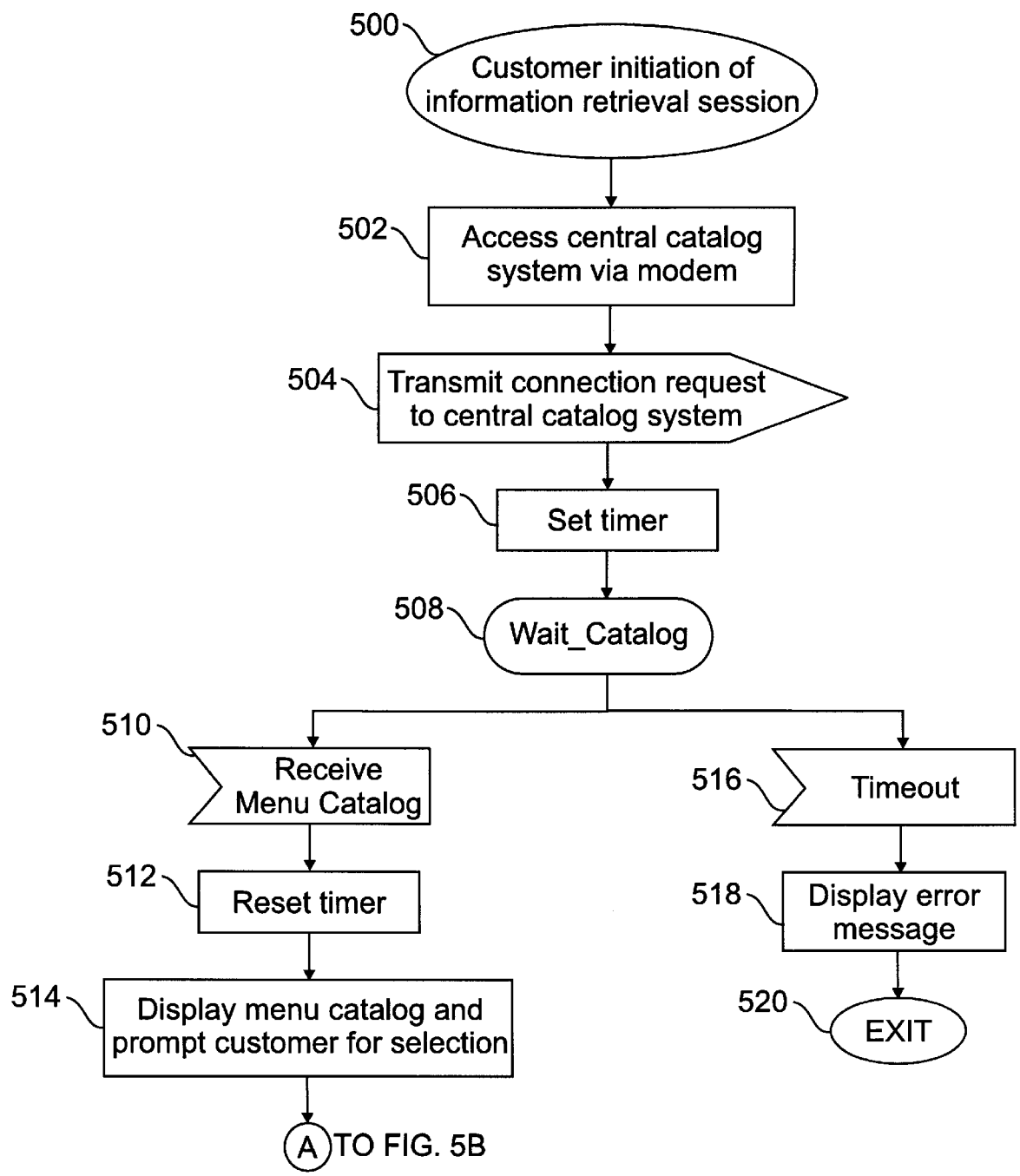
FIGS. 5A through 5D, collectively, are a flow chart describing an exemplary method according to the present invention as utilized by a customer terminal for selecting and retrieving desired information.
Figure 5B:
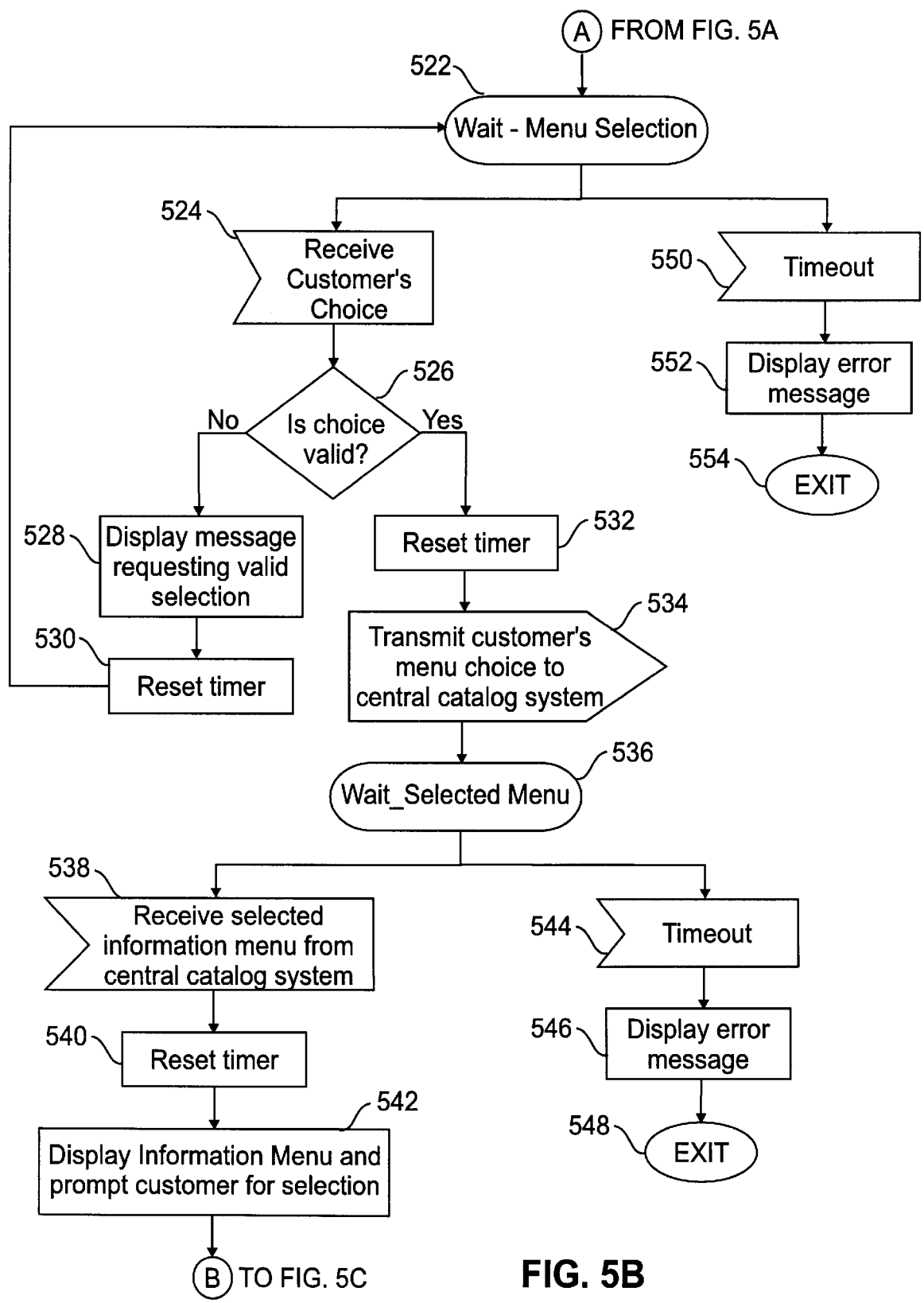
Figure 5C:
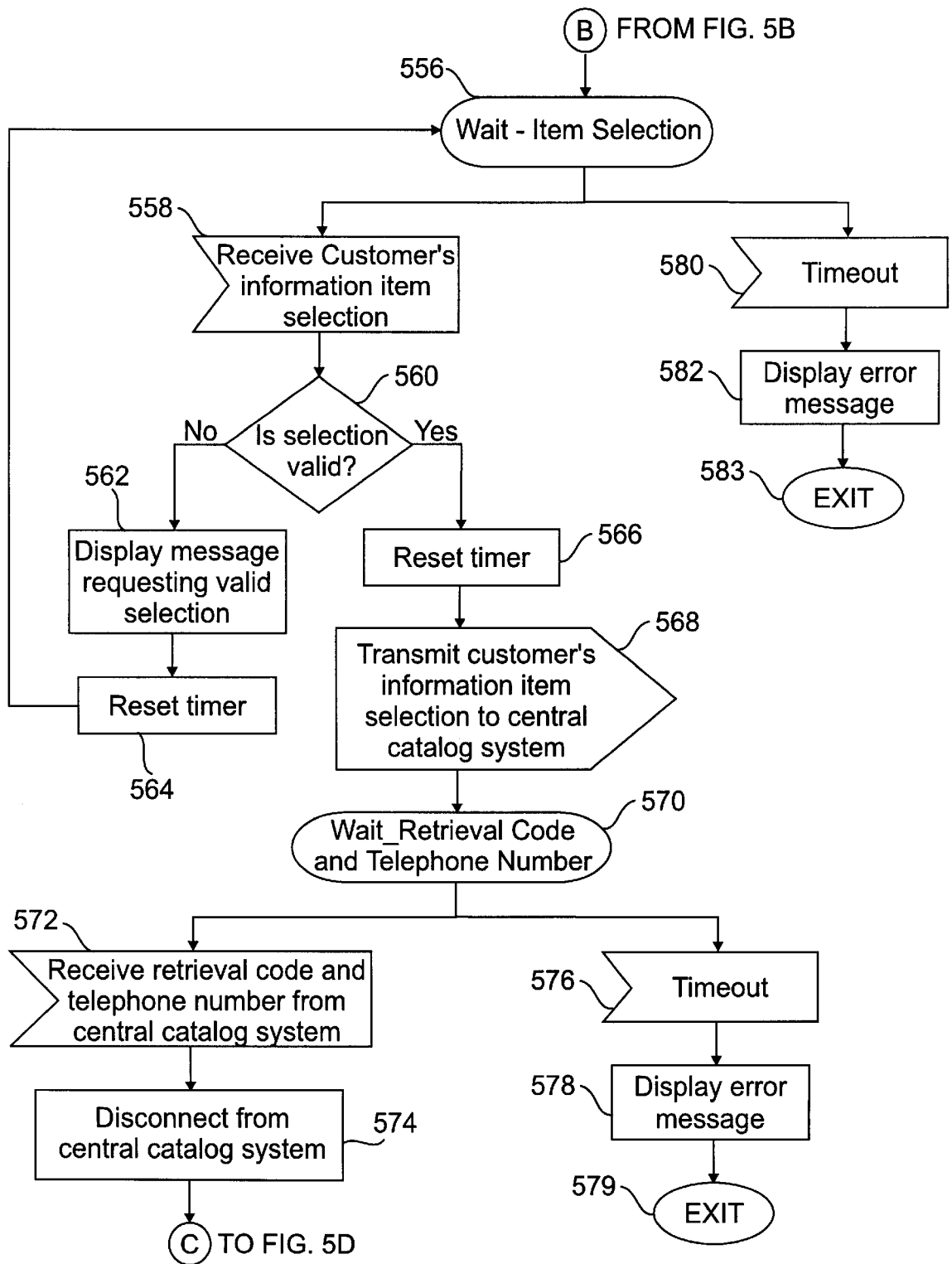

As illustrated in FIG. 5A, the customer terminal 50 will begin the processes embodying the principles of the present invention during step 500, upon initiation by the customer 5 of an information retrieval session. The customer terminal 50 will initially access the central catalog system 60 during step 502 by causing the modem 54 to dial the telephone number associated with the central catalog system 60. Thereafter, during step 504, the customer terminal 50 will transmit a connection request to the central catalog system 60.

While attempting to establish a connection, the customer terminal 50 will monitor the connection attempt to determine if a pre-defined timeout period is exceeded. A timer associated with processor 56 will be set during step 506 to monitor the timeout period. During step 508, the customer terminal 50 is waiting for either a response from the central catalog system 60 or for the timeout period to be exceeded. If the timeout period is exceeded, it will be detected during step 516. Thereafter, an error message will be displayed during step 518, before the customer terminal 50 exits the process at step 520.

The central catalog system 60 will enter the process during step 600 (FIG. 6A) upon receipt of an incoming telephone call on its associated telephone line 95. The central catalog system 60 will access the catalog configuration file 350 (FIG. 3B) during step 602 and retrieve the list of information menus 300 from column 360, as well as the associated menu descriptions from column 365 and pointers to the corresponding information menu configuration files 250 from column 370.

While waiting for a connection request from customer terminal 50, the central catalog 60 will monitor the connection attempt to determine if a pre-defined timeout period is exceeded. A timer associated with processor 62 will be set during step 604 to monitor the timeout period. The central catalog system 60 will wait during step 606 for either a connection request from the customer terminal 50 or for the timeout period to be exceeded. If the connection request command is not received before the timeout period, as detected during step 614, the central catalog system 60 will transmit an error message to the customer terminal 50 during step 616. The call will be disconnected during step 618 and the central catalog system 60 will exit the process during step 620 to wait for the next transaction.

If the connection request command is received by the central catalog system 60 within the timeout period, as detected during step 608, the central catalog system 60 will transmit the menu catalog, such as the menu catalog 300 illustrated in FIG. 3A, to the customer terminal 50 during step 610. The menu catalog 300 is populated by the central catalog system 60 with the information retrieved from columns 360 and 365 of the catalog configuration file 350 during step 602. The central catalog system 60 will then reset a timer associated with processor 62 during step 612 to monitor a further timeout period, while process control is transferred to the customer terminal 50 for customer selection of a desired information menu.

The customer terminal 50 will receive the transmitted menu catalog, such as menu catalog 300, during step 510 (FIG. 5A) from the central catalog system 60. The customer terminal 50 will reset the timeout timer associated with processor 56 during step 512. Thereafter, during step 514, the customer terminal 50 will display the menu catalog 300 on display 52 and prompt the customer to select a particular information menu, such as information menu 200, from the list presented in the menu catalog 300.

The customer terminal 50 will wait during step 522 (FIG. 5B) for either a customer information menu selection or for the timeout period to be exceeded. If the customer 5 does not enter an information menu selection before the timeout period is exceeded, as detected during step 550, an error message will be displayed during step 552. The customer terminal 50 will then exit the process at step 554.

If the customer enters an information menu selection within the timeout period, as detected during step 524, the customer terminal 50 will perform a test during step 526 to determine if the entered menu selection is valid. If the menu selection is invalid, the customer 5 will be prompted during step 528 to enter a valid selection. The timeout timer associated with processor 56 will be reset at step 530 before process control returns to step 522 to wait for another customer menu selection, in the manner described above.

If the customer's information menu selection is valid, the timeout timer associated with processor 56 will be reset during step 532, and the customer's menu selection will be transmitted to the central catalog system 60 during step 534 for further processing. Process control will pass to the central catalog system 60 while the customer terminal 50 waits during step 536 for a response from the central catalog system 60.

Process control will return to the central catalog system 60 at step 622 (FIG. 6B), wherein the central catalog system 60 is waiting for either the customer's menu selection from the customer terminal 50 or for the pre-defined timeout period to be exceeded. If the customer's menu selection is not received by the central catalog system 60 within the timeout period, as detected during step 640, the central catalog system 60 will transmit an error message to the customer terminal 50 during step 642. The central catalog system 60 will then disconnect the call during step 644 before exiting the process at step 646 to wait for the next transaction.

If the customer's menu selection is received by the central catalog system 60 within the timeout period, as detected during step 624, the central catalog system 60 will perform a test during step 626 to determine if the menu selection is valid. If the menu selection is invalid, the central catalog system 60 will transmit an error message to the customer terminal 50 during step 628. The central catalog system 60 will then disconnect the call during step 630 before exiting the process at step 632 to wait for the next transaction.

If the menu selection is valid, the central catalog system 60 will access during step 634 the appropriate information menu configuration file, such as the configuration file 250 illustrated in FIG. 2B, indicated by the pointer retrieved during step 602 that corresponds to the indicated information menu selection. The appropriate information menu configuration file 250 stores the information that is necessary to populate the selected information menu, i.e., the list of information items found in column 255, associated item descriptions found in column 260 and pricing structures found in column 265.

The central catalog system 60 will transmit to the customer terminal 50, during step 636, the selected information menu, such as menu 200, populated with the appropriate information. The central catalog system 60 will then reset a timer associated with processor 62 during step 638 to monitor a further timeout period. Process control will pass to the customer terminal 50 while the central catalog system 60 waits during step 648 for receipt from the customer terminal 50 of an indication of the information item selected by customer 5.

Process control will return to the customer terminal 50 at step 536 (FIG. 5B), wherein the customer terminal 50 is waiting for either the selected information menu 200 from the central catalog system 60 or for the pre-defined timeout period to be exceeded. If the selected information menu 200 is not received by the customer terminal 50 within the timeout period, as detected during step 544, the customer terminal 50 will display an error message to the customer 5 during step 546. The customer terminal 50 will then exit the process at step 548.

The customer terminal 50 will receive the selected information menu 200 during step 538. The customer terminal 50 will reset the timeout timer associated with processor 56 at step 540. Thereafter, during step 542, the customer terminal 50 will display the selected information menu 200 on display 52 and prompt the customer to select a particular information item, from the presented list.

The customer terminal 50 will wait during step 556 for a predefined timeout period for the customer 5 to enter the desired information item selection. If the customer's information item selection is not entered before the timeout period is exceeded, as detected during step 580, an error message will be displayed during step 582 and the process will be exited at step 583.

If the customer's information item selection is entered within the timeout period, as detected during step 558, the customer terminal 50 will perform a test during step 560 to determine if the information item selection is valid. If the information item selection is invalid, the customer 5 will be prompted at step 562 to enter a valid selection. The timeout timer associated with processor 56 will be reset at step 564 before control returns to step 556 to wait for the customer 5 to enter another information item selection, in the manner described above.

If the information item selection is valid, the timeout timer associated with processor 56 will be reset during step 566, and an indication of the customer's information item selection will be transmitted to the central catalog system 60 during step 568 for further processing. Process control will pass to the central catalog system 60 while the customer terminal 50 waits during step 570 for a response from the central catalog system 60.

Process control will return to the central catalog system 60 at step 648 (FIG. 6C), wherein the central catalog system 60 is waiting for either the customer's information item selection from the customer terminal 50 or for the pre-defined timeout period to be exceeded. If the customer's information item selection is not received by the central catalog system 60 within the timeout period, as detected during step 668, the central catalog system 60 will transmit an error message to the customer terminal 50 during step 670. The central catalog system 60 will then disconnect the call during step 672 before exiting the process at step 674 to wait for the next transaction.

If the customer's information item selection is received by the central catalog system 60 within the timeout period, as detected during step 650, the central catalog system 60 will perform a test during step 652 to determine if the information item selection is valid. If the information item selection is invalid, the central catalog system 60 will transmit an error message to the customer terminal 50 during step 654. The central catalog system 60 will then disconnect the call during step 656 before exiting the process at step 658 to wait for the next transaction.

If the information item selection is valid, the central catalog system 60 will again access the information menu configuration file 250 (FIG. 2B) during step 660 to obtain the retrieval code and telephone number from the entries in columns 270 and 275, respectively, corresponding to the selected information item.

The central catalog system 60 will then transmit the retrieval code and telephone number to the customer terminal 50 during step 662. The central catalog system 60 will disconnect the call during step 664 before exiting the process at step 666 to wait for the next transaction.

Process control will return to the customer terminal 50 at step 570 (FIG. 5C), wherein the customer terminal 50 is waiting for either the retrieval code and telephone number corresponding to the selected information item or for the pre-defined timeout period to be exceeded. If the retrieval code and telephone number are not received by the customer terminal 50 within the timeout period, as detected during step 576, the customer terminal 50 will display an error message to the customer during step 578. Thereafter, the customer terminal 50 will exit the process at step 579.

The customer terminal 50 will receive from the central catalog system 60 the retrieval code and telephone number corresponding to the selected information item during step 572. Thereafter, the customer terminal 50 will terminate the connection to the central catalog system 60 during step 574.

It is noted that in the alternate embodiment of the central catalog system 60, discussed above, wherein copies of the configuration files 250, 350 are periodically provided to each customer 5 for local storage in the memory 58 of each customer's computer terminal 50, the above interaction between the customer terminal 50 and the central catalog system 60 would be unnecessary and all of the above processing steps would be performed by the customer terminal 50. Further, all the relevant configuration files 250, 350 would be accessed in the local memory 58 of the customer terminal 50.

Regardless of whether the configuration files 250, 350 reside locally in the memory of customer terminal 50, or are stored centrally in a central catalog system 60, any further processing requires interaction between the customer terminal 50 and the supplier terminal 15, 25, 35 of the information supplier 10, 20, 30 that provides the selected information item. For illustrative purposes, it will be assumed that during the previously described process steps, customer 5 has selected an information item that is provided by information supplier 10. Thus, the customer terminal 50 will interact with supplier terminal 15 in order to retrieve the desired information item.

The customer terminal 50 will attempt to establish a connection to the supplier terminal 15 of the information supplier 10 during step 584 by causing the modem 54 to dial the telephone number previously received from the central catalog system 60 during step 572. Thereafter, during step 585, the customer terminal 50 will transmit a connection request command to supplier terminal 15.

The connection request command will preferably include the retrieval code identifying the selected information item, as well as a customer identification number, used for billing verification and data recording purposes. In addition, the connection request command can be configured to include any additional information that the information supplier, such as supplier 10, may need to know about the customer 5 or customer terminal 50 in order to properly download the selected information item.

For example, information on the particular computer hardware or operating system employed by customer terminal 50 may be transmitted to the supplier 10 for compatibility purposes. The transmitted compatibility information can be utilized by supplier 10 to determine the particular character code set, such as the ASCII character code set, that downloaded data must conform to in order to be interpreted by customer terminal 50.

In addition, where the requested information item corresponds to a software program, the transmitted compatibility information can be utilized by supplier 10 to download the version of the software program that has been developed for the respective type of customer terminal 50, such as software specifically for a Macintosh personal computer or for a personal computer operating under a DOS or OS/2 operating system.

While attempting to establish a connection with the respective information supplier 10, the customer terminal 50 will monitor the connection attempt to determine if a pre-defined timeout period is exceeded. A timer associated with processor 56 will be set during step 586 to monitor the timeout period. During step 587, the customer terminal 50 is waiting for one of three events: receipt of the requested information item or an error message from the supplier terminal 15 or for the timeout period to be exceeded. If the timeout period is exceeded, as detected during step 596, an error message will be displayed during step 597 and the customer terminal 50 will exit the process at step 598.

The supplier terminal, such as terminal 15, will enter the process during step 700 (FIG. 7A) upon receipt of an incoming telephone call on its premium-rate telephone line, e.g., the 900 telephone line 80 associated with supplier terminal 15. The supplier terminal 15 will then access the information item configuration file 400 (FIG. 4) during step 704.

While waiting for a connection request from customer terminal 50, the supplier terminal 15 will monitor the connection attempt to determine if a pre-defined timeout period is exceeded. A timer associated with processor 42 will be set during step 706 to monitor the timeout period. The supplier terminal 15 will wait during step 708 for either the connection request from the customer terminal 50 or for the timeout period to be exceeded. If the connection request command is not received before the timeout period is exceeded, as detected during step 728, the supplier terminal 15 will transmit an error message to the customer terminal 50 during step 730. The call will be disconnected during step 732 and the supplier terminal 60 will exit the process during step 734 to wait for the next transaction.

If the connection request command is received by the supplier terminal 15 within the timeout period, as detected during step 710, supplier terminal 15 will perform a test during step 712 to determine if the retrieval code and customer identification number received with the connection request command are valid.

If the received retrieval code or customer identification number is invalid, an error message is transmitted to the customer terminal 50 during step 714. The supplier terminal 15 will create a record of the invalid transaction during step 716 that includes billing verification information and an indication of the error disposition. The call will then be disconnected during step 718 and the supplier terminal 15 will exit the process during step 720 to wait for the next transaction. Process control will thereafter return to the customer terminal 50 at step 593, upon receipt of the error message transmitted by supplier terminal 15 during step 714. The customer terminal 50 will then display an error message to the customer during step 594 before exiting the process at step 595.

If the supplier terminal 15 determines during step 712, however, that the retrieval code and customer identification number received from the customer terminal 50 are valid, the supplier terminal 15 will retain process control. During step 722, the supplier terminal 15 will retrieve the pricing structure and pointer to the appropriate data file, such as a data file 450, from the appropriate row, such as rows 425, 430, 435, in the previously accessed information item configuration file 400 (FIG. 4). Thereafter, the supplier terminal 15 will send to the telephone company, during step 724, an indication of the appropriate pricing structure to be utilized for billing the call.

It is noted that step 724 is unnecessary where an information supplier, such as supplier 30, implements the variable billing feature by utilizing a plurality of 900 telephone lines, each having a unique associated pricing structure, as opposed to utilizing a single enhanced 900 telephone line, as discussed above.

The supplier terminal 15 will access, during step 726, the data file, such as data file 450, indicated by the data file pointer retrieved during step 722 to retrieve the selected information item. During step 736, the supplier terminal 15 will transmit the selected information item to customer terminal 50. The supplier terminal 15 will reset the timeout timer associated with processor 42 during step 738. Process control will pass to the customer terminal 50, while the supplier terminal 15 waits for an acknowledgement during step 740 for a pre-defined timeout period.

Figure 5D:
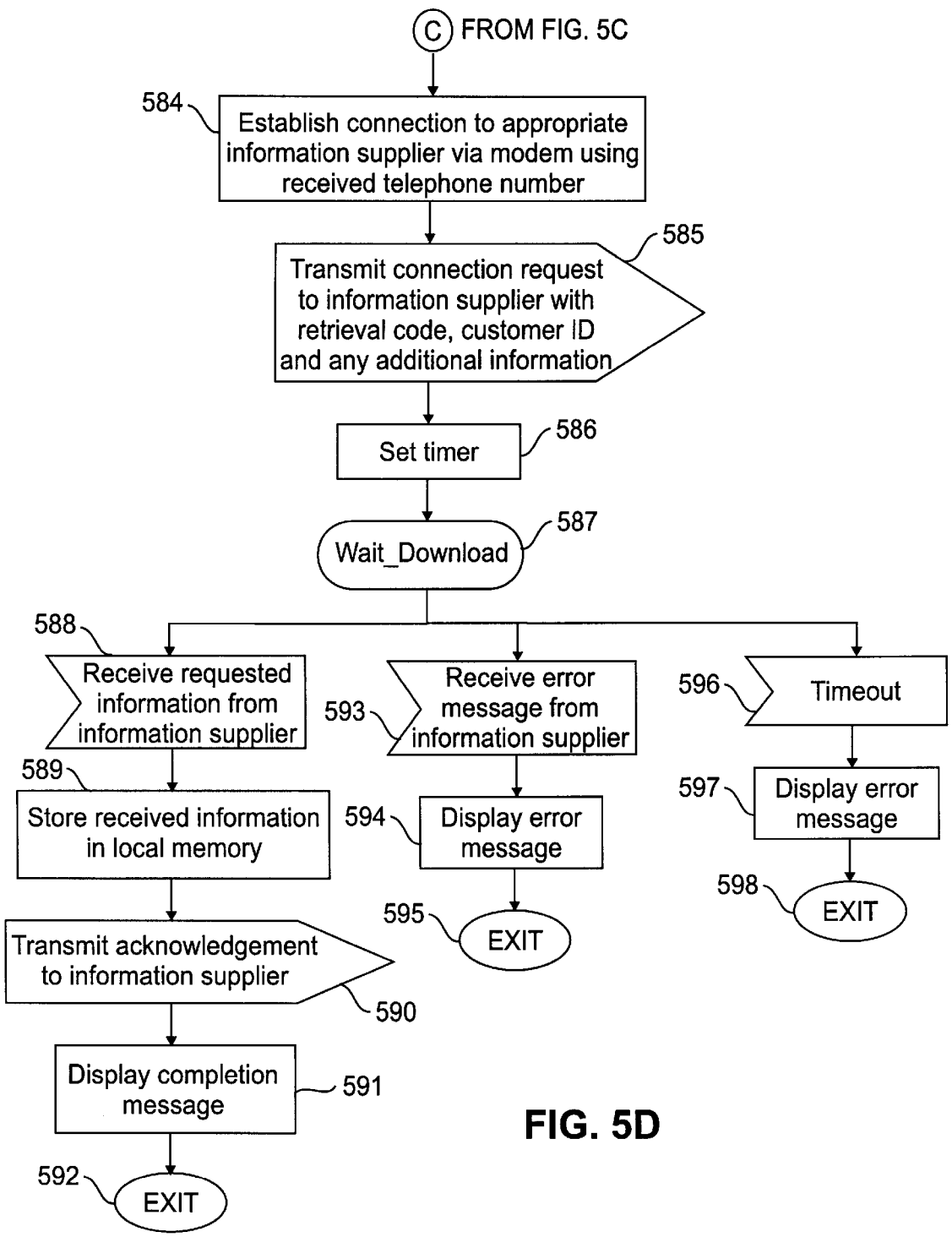

The customer terminal 50 will receive the information item downloaded from the supplier terminal during step 588 (FIG. 5D). The customer terminal 50 will store the downloaded information item in local memory 58, which may be a secondary storage device such as a disk, during step 589. The customer terminal 50 will then transmit an acknowledgement to the supplier terminal 15 during step 590. Thereafter, the customer terminal 50 will display a completion message to the customer during step 591 prior to exiting the process at step 592.

As indicated above, the supplier terminal 15 will wait during step 740 for a pre-defined timeout period for the acknowledgement from the customer terminal 50 that the transmitted information item has been properly received. During step 740, the supplier terminal 15 is waiting for one of three events: receipt of an acknowledgement from customer terminal 15, a disconnect event or for the timeout period to be exceeded.

First, if the acknowledgement message is not received from the customer terminal 50 before the timeout period is exceeded, as detected during step 756, the supplier terminal 15 will create a record of the transaction during step 758 that includes billing verification information and an indication of the timeout condition. The call is then disconnected during step 760 before the supplier terminal 15 exits the process at step 762 to wait for the next transaction.

Second, if the call is disconnected before the acknowledgement message is received from customer terminal 50, as detected during step 750, the supplier terminal 15 will create a record of the transaction during step 752 that includes billing verification information and an indication of the disconnect disposition. The information supplier will then exit the process at step 754 to wait for the next transaction.

Finally, if the supplier terminal 15 receives an acknowledgement from the customer terminal 50 within the timeout period, as detected during step 742, the supplier terminal 15 will create a record of the transaction during step 744 that includes billing verification information and an indication of the successful disposition. The call is then disconnected during step 746 before the supplier terminal 15 exits the process at step 748 to wait for the next transaction.

It is noted that the transaction records created by the supplier terminal 15 during steps 716, 744, 752, 758 are preferably for billing verification purposes only. The telephone company will directly bill the customer for the transaction based on the pricing structure that has been indicated by the information supplier, in the manner discussed above. In a preferred embodiment, each transaction record created by the supplier terminal 15 during steps 716, 744, 752, 758 will include the following information: the automatic numbering identification (ANI), i.e., the telephone number of the customer 5 making the call; the billing telephone number (BTN), i.e., the telephone number to be billed for the call, which may be different from the ANI; date and time of the call; received retrieval code; customer identification number; and a disposition code that indicates how the call was handled.

In an alternate embodiment of the invention, each retrieval code can include a plurality of data fields so that the customer 5 may specify certain search parameters that define the data to be retrieved from the information supplier. For example, a retrieval code can include an indication that the customer 5 only wants data that satisfies a given date constraint or exceeds a given threshold. In this manner, the retrieval codes may effectively include customer specified queries that are transmitted to the information supplier 10, 20, 30 so that only desired portions of any given information item are extracted by the supplier terminal 15, 25, 35 for transmission to the customer terminal 50.

It is to be understood that the embodiments and variations shown and described herein are illustrative of the principles of this invention only and that various modifications may be implemented by those skilled in the art without departing from the scope and spirit of the invention.

I claim:

1. A system for distributing information items from a plurality of suppliers to a customer, said information distribution system comprising:

a customer terminal associated with said customer;

a supplier terminal associated with each of said information suppliers, said supplier terminal having a telephone line identified by a telephone number;

a communications network of a telecommunications company connected to said customer terminal and said supplier terminals, for the transmission of communications between said terminals, wherein a call by said customer terminal over said network to said telephone line of said supplier terminal results in a fee being charged by said telecommunications company to said customer for a downloaded information item, a portion of said fee being transferred by said telecommunications company to said associated information supplier;

means for associating identifying labels with each of said information items provided by each of said information suppliers, each of said identifying labels comprising a retrieval code that identifies each of said information items by the respective supplier;

an information menu configuration file having a description of said available information items and entries corresponding to each of said available information items, each of said information item entries storing an indication of corresponding identifying label and said telephone number associated with said information supplier, said configuration file being accessible by said customer;

said customer terminal comprising:

means for presenting said customer with a listing of each of said available information items;

means for receiving from said customer a selection of a desired information item, said selected information item being provided by a selected information supplier;

means for accessing said entry of configuration file corresponding to said selected information item to retrieve said corresponding identifying label and said corresponding telephone number;

means for establishing a connection over said telecommunications network with said supplier terminal associated with said selected information supplier by dialing said retrieved telephone number;

means for transmitting a request to said supplier terminal of said selected information supplier for said selected information item identified by said identifying label;

means for receiving from said selected information supplier said selected information item;

said supplier terminal further comprising:

a data file for storing each of said information items provided by said corresponding information supplier;

a supplier information item configuration file having an entry corresponding to each of said information items provided by said corresponding information supplier, each of said information item entries of said supplier information item configuration file storing said corresponding identifying label and an associated pointer for pointing to said corresponding data file;

means for receiving a request from said customer terminal for said selected information item identified by said identifying label;

means for accessing said data file corresponding to said identifying label to retrieve said selected information item; and means for downloading said selected information item to said customer terminal.

2. The information distribution system according to claim 1, wherein said telephone line of said supplier terminal is a premium-rate 900 service telephone line.

3. The information distribution system according to claim 1, wherein said telephone line of said supplier terminal is a premium-rate telephone line having an identifying telephone number with a 976 local exchange.

4. The information distribution system according to claim 1, further including a central catalog system for storing said information menu configuration file, said central catalog system being accessible by said customer over said network.

5. The information distribution system according to claim 1, wherein said customer terminal further comprises a storage means for storing said information menu configuration file.

6. The information distribution system according to claim 1, wherein each information item entry of said supplier configuration file further includes an indication of a pricing structure to be utilized in establishing said fee for said corresponding information item.

7. The information distribution system according to claim 6, further including means for transmitting said pricing structure associated with said selected information item to said telecommunications company to be utilized in establishing said fee for said selected information item.

8. A system for distributing information items provided by a plurality of information suppliers to a customer over a communications network of a telecommunications company, said information distribution system employing a processing unit and distributed storage means, said information distribution system comprising:

a telephone line having an identifying telephone number associated with each of said information suppliers, wherein a call by said customer to one of said telephone lines results in a fee being charged by said telecommunications company to said customer for a downloaded information item, a portion of said fee being transferred by said telecommunications company to said associated information supplier;

means for associating identifying labels with each of said information items provided by each of said respective information suppliers, each said identifying labels comprising a retrieval code that identifies its associated information item by the respective information supplier;

an information menu configuration file in said storage means having a description of information entries and an entry corresponding to each of said information items, said information menu configuration file being accessible by said customer;

means for storing in each of said information item entries an indication of a corresponding identifying label and said telephone number associated with said information supplier that provides corresponding information item;

means for displaying to said customer a listing of each of available information items;

means for receiving from said customer a selection of one of said information items to be retrieved from said information suppliers, said selected information item being provided by a selected information supplier;

means for accessing said information item entries of said configuration file corresponding to said selected information item to retrieve an associated identifying label and telephone number;

means for establishing a connection over said telecommunications network between said customer and said selected information supplier associated with said retrieved telephone number;

means for transmitting said retrieved identifying label corresponding to said selected information item to said selected information supplier;

means for retrieving said selected information item from said information supplier; and means for transmitting said retrieved selected information item to said customer.

9. The information distribution system according to claim 8, wherein said telephone line is a premium-rate 900 service telephone line.

10. The information distribution system according to claim 8, wherein said telephone line is a premium-rate telephone line having an identifying telephone number with a 976 local exchange.

11. The information distribution system according to claim 8, further including a central catalog system for storing said configuration file, said central catalog system being accessible by said customer over said network.

12. The information distribution system according to claim 8, further including a customer terminal associated with said customer, said customer terminal including a storage means for storing said configuration file.

13. The information distribution system according to claim 8, further including means for transmitting to said telecommunications company an indication of a pricing structure to be utilized in establishing said fee for each call to each of said telephone lines.

14. The information distribution system according to claim 8, further comprising:

means for grouping a plurality of related information items into specialized information menus;

means for displaying to said customer a listing of each of said specialized information menus;

means for receiving from said customer a selection of one of said specialized information menus to be displayed; and means for displaying to said customer said selected specialized information menu which includes a listing of each of said related available information items.

15. A system for use by a customer to select and retrieve an information item from among a plurality of available information items provided by a plurality of information suppliers, said customer employing a customer terminal having a processor and storage means, each of said information suppliers employing a supplier terminal, each of said supplier terminals having a telephone line identified by a telephone number, said information selection and retrieval system comprising:

a first data file having entries corresponding to each of said available information items, each of said information item entries storing an identifying label corresponding to said information item and said telephone number associated with said supplier terminal of said information supplier that provides corresponding information items;

means for selecting one of said information items listed in said data file to be retrieved from one of said information suppliers, said selected information item being provided by a selected information supplier;

means for retrieving from said data file entry corresponding to said selected information item said corresponding identifying label and said corresponding telephone number;

means for establishing a connection over a telecommunication network with said selected supplier terminal corresponding to said selected information supplier by dialing said retrieved telephone number, wherein said establishment of said connection results in a fee being charged by said telecommunications company to said customer, a portion of said fee being transferred by said telecommunications company to said associated information supplier;

means for transmitting a request over said connection to said supplier terminal for said selected information item identified by said identifying label; and means for receiving from said selected supplier terminal said selected information item.

16. The information selection and retrieval system according to claim 15, wherein said telephone line is a premium-rate 900 service telephone line.

17. The information selection and retrieval system according to claim 15, wherein said telephone line is a premium-rate telephone line having an identifying telephone number with a 976 local exchange.

18. The information selection and retrieval system according to claim 15, wherein said data file is stored at a central catalog system which may be accessed by said customer over said telecommunications network.

19. The information selection and retrieval system according to claim 15, wherein said data file is stored in said storage means of said customer terminal.

20. The information selection and retrieval system according to claim 15, wherein one or more of said supplier terminals has a plurality of said associated telephone lines, each of said plurality of telephone lines having an associated premium-rate telephone number and pricing structure.

21. The information selection and retrieval system according to claim 20, wherein each of said information item entries stores one of a plurality of premium-rate telephone numbers associated with said information item corresponding to said entry.

22. A system for distributing information items from information suppliers to a customer by downloading said information items over a communications network, said information distribution system comprising:

a customer terminal associated with said customer;

a supplier terminal associated with each of said information suppliers, said supplier terminal having a telephone line identified by a telephone number;

a communications network of a telecommunications company connected to said customer terminal and said supplier terminals, for the transmission of communications between said terminals including a retrieval code identifying a desired information item, wherein a call by said customer terminal over said network to said telephone line of said supplier terminal results in the selection and downloading of the desired information item, and a fee based on the value of the downloaded information item being charged by said telecommunications company to said customer, a portion of said fee being transferred by said telecommunications company to said associated information supplier.

23. The system of claim 22, wherein said telephone line is a premium-rate 900 service telephone line.

24. The system of claim 22, wherein said telephone line is a premium-rate telephone line is having an identifying telephone number with a 976 local exchange.

25. A system for distributing information items provided by information suppliers to a customer by downloading said information items over a communications network of a telecommunications company, said information distribution system employing a processing unit and distributed storage device, said information distribution system further comprising a telephone line having an identifying telephone number associated with each of said information suppliers, wherein a call by said customer to one of said telephone lines results in the transmission of a retrieval code identifying a desired information item and the selection and downloading of the desired information item, and a fee based upon the value of the downloaded information item being charged by said telecommunications company to said customer, a portion of said fee being transferred by said telecommunication company to said associated information supplier.

26. The system of claim 25, wherein said telephone line is a premium-rate 900 service telephone line with a fee that matches the fee based upon the value of the downloaded information item.

27. The system of claim 25, wherein said telephone line is a premium-rate telephone line having an identifying telephone number with a 976 local exchange.

28. The system of claim 25, further comprising:
    means for grouping a plurality of related information items into specialized information menus;
    means for displaying to said customer a listing of each of said specialized information menus;
    means for receiving from said customer a selection of one of said specialized information menus to be displayed; and
    means for displaying to said customer said selected specialized information menu which includes a listing of each of related available information items.

29. A method for distributing information items from information suppliers to a customer by downloading said information items over a communications network of a telecommunications company, said information distribution method employing a processing unit and distributed storage means, said information distribution method comprising the steps of:
    providing a telephone line having an identifying telephone number for each of said information suppliers;
    calling by said customer to telephone line resulting in the transmission of a retrieval code identifying a desired information item and the selection and downloading of the desired information item;
    charging a fee by said telecommunications company to said customer based upon the value of the downloaded information item; and
    transferring a portion of said fee by said telecommunications company to said information supplier associated with said call.

30. The method of claim 29 further comprising the steps of displaying to said customer a listing of available information items; and
    receiving from said customer a selection of one of said information items to be retrieved from said information suppliers, said selected information item being provided by a selected information supplier.

31. A system for distributing information items provided by information suppliers to a customer by downloading said information items over a communications network of a telecommunications company, said information distribution system comprising a processing unit and distributed storage means, means for associating an identifying label with each of said information items provided by each of said respective information suppliers; and a configuration file in said storage means, said configuration file having entries corresponding to each of said information items, said configuration file being accessible by said customer, said information distribution system further comprising a telephone line having an identifying telephone number associated with each of said information suppliers, wherein a call by said customer to one of said telephone lines results in the selection and downloading of a desired information item, and a fee based upon the value of the downloaded information item being charged by said telecommunications company to said customer, a portion of said fee being transferred by said telecommunication company to said associated information supplier.

32. The system of claim 31 further comprising means for storing in each of said information item entries an indication of said corresponding identifying label and said telephone number associated with said information supplier that provides said corresponding information item.

33. The system of claim 31 further comprising:
    means for displaying to said customer a listing of each of said available information items; and
    means for receiving from said customer a selection of one of said information items to be retrieved from said information suppliers, said selected information item being provided by a selected information supplier.

34. The system of claim 33 further comprising means for accessing said-information item entry of said configuration file corresponding to said selected information item to retrieve said associated identifying label and telephone number.

35. The system of claim 34 further comprising means for automatically establishing a connection over said telecommunications network between said customer and said selected information supplier associated with said retrieved telephone number upon retrieval of said retrieved telephone number.

36. The system of claim 34 further comprising:
    means for transmitting said retrieved identifying label corresponding to said selected information item to said selected information supplier;
    means for retrieving said selected information item from said information supplier; and
    means for transmitting said retrieved selected information item to said customer.

37. The system of claim 31 further comprising a central catalog system for storing said configuration file, said central catalog system being accessible by said customer over said network.

38. The system of claim 31, further comprising a customer terminal associated with said customer, said customer terminal including a storage means for storing said configuration file.

39. A system for distributing information items from information suppliers to a customer by downloading said information items over a communications network, said information distribution system comprising:

a customer terminal associated with said customer;

a supplier terminal associated with each of said information suppliers, said supplier terminal having a telephone line identified by a telephone number;

means for associating an identifying label with each of said information items provided by each of said respective information suppliers;

a first configuration file having an entry corresponding to each of said available information items, each of said information items storing an indication of said corresponding identifying label and said telephone number associated with said information supplier, said first configuration file being accessible by said customer; and a communications network of a telecommunications company connected to said customer terminal and said supplier terminals, for the transmission of communications between said terminals, wherein a call by said customer terminal over said network to said telephone line of said supplier terminal results in the selection and downloading of a desired information item, and a fee based on the value of the downloaded information item being charged by said telecommunications company to said customer, a portion of said fee being transferred by said telecommunications company to said associated information supplier.

40. The system of claim 39 wherein said customer terminal further comprises:

means for presenting said customer with a listing of each of said available information items;

means for receiving from said customer the selection of the desired information item, said selected information item being provided by a selected information supplier;

means for accessing said entry of said first configuration file corresponding to said selected information item to retrieve said corresponding identifying label and said corresponding telephone number;

means for establishing a connection over said telecommunications network with said supplier terminal associated with said selected information supplier by dialing said retrieved telephone number;

means for transmitting a request to said supplier terminal of said selected information supplier for said selected information item identified by said identifying label; and means for receiving from said selected information supplier said selected information item.

41. The system of claim 40, wherein said customer terminal further comprises a storage means for storing the first configuration file.

42. The system of claim 39 further comprising a central catalog system for storing said first configuration file, said central catalog system being accessible by said customer over said network.

43. A method for use by a customer to select and retrieve an information item from among a plurality of available information items provided by a plurality of information suppliers, said customer employing a customer terminal having a processor and storage means, each of said information suppliers employing a supplier terminal, each of said supplier terminals having a telephone line identified by a telephone number, said method comprising the steps of:

accessing a first data file having a description of each of said available information items and an entry corresponding to each of said available information items, each of said information item entries storing an identifying label corresponding to said information item and said telephone number associated with said supplier terminal of said information supplier that provides said corresponding information item;

selecting one of said information items listed in said data file to be retrieved from one of said information suppliers, said selected information item being provided by a selected information supplier;

retrieving from said data file the entry corresponding to said selected information item, said corresponding identifying label, and said corresponding telephone number;

establishing a connection over a telecommunication network with said selected supplier terminal corresponding to said selected information supplier by dialing said retrieved telephone number, wherein said establishment of said connection results in a fee based upon the value of the value of said selected information item being charged by said telecommunications company to said customer, a portion of said fee being transferred by said telecommunications company to said associated information supplier;

transmitting a request over said connection to said supplier terminal for said selected information item identified by said identifying label; and receiving from said selected supplier terminal said selected information item.

44. A system for distributing information items from information suppliers to a customer by downloading said information items over a communications network, said information distribution system comprising:

a customer terminal associated with said customer;

a supplier terminal associated with each of said information suppliers, said supplier terminal having a telephone line identified by a telephone number;

a data file for storing each of said information items provided by each of said information suppliers;

a configuration file having entries corresponding to each of said information items provided by each of said information suppliers, each of said information item entries of said configuration file storing an identifying label and an associated pointer for pointing to a corresponding data file;

means for receiving a request from said customer terminal for a selected information item identified by said identifyg label;

means for accessing said data file corresponding to said identifying label to retrieve said selected information item;

means for downloading said selected information item to said customer terminal; and a communications network of a telecommunications company connected to said customer terminal and said supplier terminals, for the transmission of communications between said terminals, wherein a call by said customer terminal over said network to said telephone line of said supplier terminal results in the selection and downloading of a desired information item, and a fee based on the value of the downloaded information item being charged by said telecommunications company to said customer, a portion of said fee being transferred by said telecommunications company to said associated information supplier.

45. The system of claim 44, wherein each information entry of said configuration file further includes an indication of a pricing structure to be utilized in establishing said fee for said corresponding information item.

46. The system of claim 45, further including means for transmitting said pricing structure associated with said selected information item to said telecommunications company to be utilized in establishing said fee for said selected information item.

47. A method for distributing information items from information suppliers to a customer by downloading said information items over a communications network of a telecommunications company, said information distribution method employing a processing unit and distributed storage device, said information distribution method comprising the steps of:

providing a telephone line having an identifyg telephone number for each of said information suppliers;

associating an identifying label with each of said information items provided by each of said respective information suppliers;

creating a configuration file in said storage device, said configuration file having entries corresponding to each of said information items, said configuration file being accessible by said customer;

calling by said customer to one of said telephone lines resulting in the selection and downloading of a desired information item;

charging a fee by said telecommunications company to said customer based upon the value of the downloaded information item; and transferring a portion of said fee by said telecommunications company to said information supplier associated with said call.

48. The method of claim 47 further comprising the steps of storing in each of said information item entries an indication of a corresponding identifying label and said telephone number associated with said information supplier that provides said corresponding information item.

49. The method of claim 48 further comprising the steps of:

accessing said information item entry of said configuration file corresponding to said selected information item to retrieve said identifying label and telephone number;

establishing a connection over said telecommunications network between said customer and said selected information supplier associated with said retrieved telephone number;

transmitting said retrieved identifying label corresponding to said selected information item to said selected information supplier;

retrieving said selected information item from said information supplier; and transmitting said retrieved selected information item to said customer.

* * * * *